(12) United States Patent
Sullivan

(10) Patent No.: US 11,526,922 B2
(45) Date of Patent: Dec. 13, 2022

(54) METHOD, NON-TRANSITORY COMPUTER-READABLE STORAGE MEDIA, AND SYSTEM FOR PRESENTATION OF DIGITAL MEDIA ASSETS BASED ON ASSESSED VALUE

(71) Applicant: IRIS.TV, INC., Los Angeles, CA (US)

(72) Inventor: Thomas J. Sullivan, Los Angeles, CA (US)

(73) Assignee: IRIS.TV INC., Los Angeles, CA (US)

( * ) Notice: Subject to any disclaimer, the term of this patent is extended or adjusted under 35 U.S.C. 154(b) by 22 days.

(21) Appl. No.: 16/055,097

(22) Filed: Aug. 4, 2018

(65) Prior Publication Data

US 2019/0043114 A1 Feb. 7, 2019

Related U.S. Application Data

(60) Provisional application No. 62/541,294, filed on Aug. 4, 2017.

(51) Int. Cl.
| | | |
|---|---|---|
| *G06Q 30/00* | (2012.01) | |
| *G06Q 30/06* | (2012.01) | |
| *G06Q 30/02* | (2012.01) | |
| *G06F 16/907* | (2019.01) | |
| *G06F 16/903* | (2019.01) | |

(52) U.S. Cl.
CPC ....... *G06Q 30/0631* (2013.01); *G06F 16/907* (2019.01); *G06F 16/90348* (2019.01); *G06Q 30/0202* (2013.01); *G06Q 30/0278* (2013.01)

(58) Field of Classification Search
None
See application file for complete search history.

(56) References Cited

U.S. PATENT DOCUMENTS

| 10,353,907 | B1 * | 7/2019 | Gupta | G06F 16/9535 |
| 2008/0222680 | A1 * | 9/2008 | Murakami | H04N 5/44543 |
| | | | | 725/46 |
| 2012/0151511 | A1 * | 6/2012 | Bernard | H04H 60/46 |
| | | | | 725/10 |
| 2014/0067770 | A1 * | 3/2014 | Cheong | G06F 11/1048 |
| | | | | 707/687 |
| 2017/0339020 | A1 * | 11/2017 | Khanna | H04L 67/10 |
| 2017/0351767 | A1 * | 12/2017 | Suzuki | G06Q 30/0631 |
| 2018/0373802 | A1 * | 12/2018 | Deng | G06Q 50/01 |

OTHER PUBLICATIONS

Andrade, Maria Teresa, Novel Hybrid Approach to Content Recommendation Based on Predicted Profiles, Dec. 1, 2013, 2013 IEEE 10th Conference on Ubiquitous Intelligence and Computing, 2013 IEEE 10th International Conference on Autonomic and Trusted Computing, pp. 507-514 (Year: 2013).*

* cited by examiner

*Primary Examiner* — Jeffrey A. Smith
*Assistant Examiner* — Timothy J Kang
(74) *Attorney, Agent, or Firm* — Wong & Rees LLP; Zhichong Gu

(57) ABSTRACT

Assets in an asset portfolio are evaluated using historical data and, optionally, additional other measurable characteristics for the assets in the asset portfolio. Each asset is assigned a valuation that represents past consumption and expected future consumption of the asset. The valuation is used to create recommended sets of assets from the asset portfolio. The recommended sets of assets are sent to user devices for consumption which is further monitored for accuracy.

18 Claims, 6 Drawing Sheets

Ordered List of Digital Assets

Ordered List of Digital Assets

US 11,526,922 B2

METHOD, NON-TRANSITORY COMPUTER-READABLE STORAGE MEDIA, AND SYSTEM FOR PRESENTATION OF DIGITAL MEDIA ASSETS BASED ON ASSESSED VALUE

PRIORITY CLAIM

This application claims the benefit of U.S. Provisional Application No. 62/541,294, filed Aug. 4, 2017, the entire contents of which is hereby incorporated by reference for all purposes as if fully set forth herein, under 35 U.S.C. § 119(e).

TECHNICAL FIELD

Embodiments relate generally to multimedia selection and, more specifically, to techniques for automatically selecting multimedia content.

BACKGROUND

The proliferation of digital content such as video, photographical, audio, textual, etc., made available to online consumers has exploded. Digital content providers have attempted to predict how users will consume digital content and, further, which digital content will be consumed by a particular user. Correlations between user interests and user consumption have been used to attempt to predict what digital content the user will be interested in consuming. Other correlations between similar users or groups of users have also been used to attempt to make such predictions. Most approaches have been focused on the user's interests and have not shown much success.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
3.0. Functional Overview
4.0. Digital Asset Valuation
5.0. The Asset Portfolio Manager
6.0. Temporal Decomposition of Asset Value
7.0. Methodology
 7.1. Asset Sub-Unit Consumption
 7.2. Computing the Percentage Watched Using Historical Data
 7.3. Value-Based Digital Assets Selection
8.0. Continuous Play Video Recommendations
 8.1. Varying an Online Video's Asset Value Based on the Position of the Asset in the Playlist
 8.2. Reduced Asset Value Calculations
 8.3. An Example of Transforming Consumption of an Asset into a Tangible Value
 8.4. An Example of Speeding Up the Computing Device
9.0. Implementation Mechanism—Hardware Overview
10.0. Extensions and Alternatives 1.0. General Overview This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format and should be understood as merely a conceptual prelude to a more detailed description of example possible embodiments that follows below.

In an embodiment, assets in an asset portfolio are evaluated using historical data and, optionally, additional other measurable characteristics for the assets in the asset portfolio. Each asset is assigned a valuation that represents past consumption and expected future consumption of the asset. The valuation is used to create recommended sets of assets from the asset portfolio. The recommended sets of assets are sent to users for consumption which is further monitored for accuracy.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0. Structural Overview

Figure 1A:
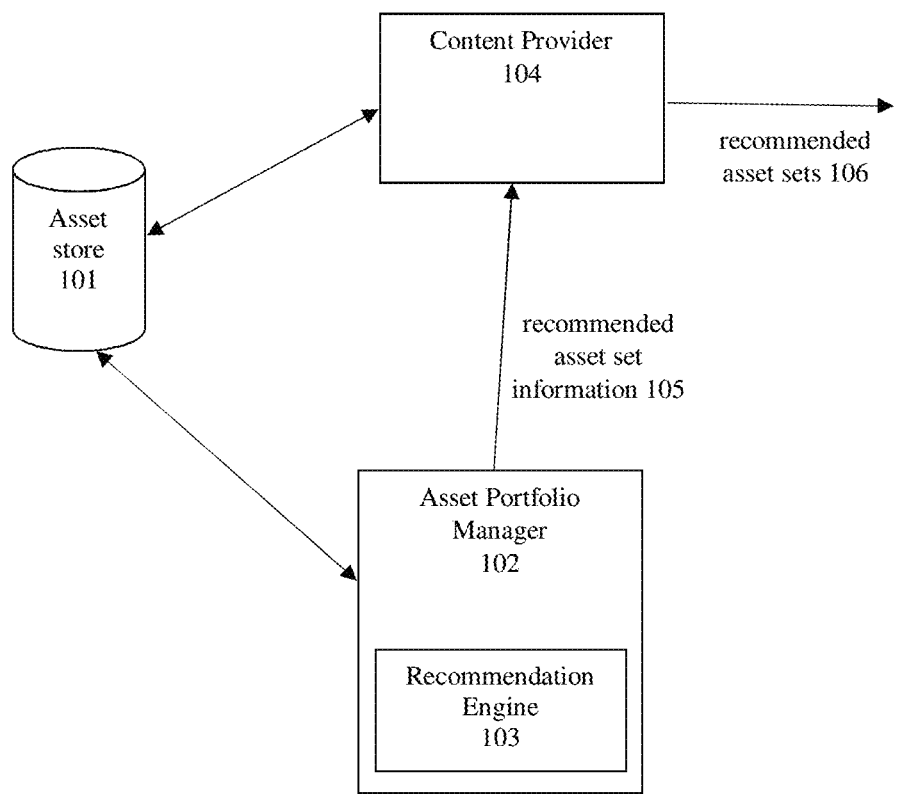
FIGS. 1A and 1B illustrate example asset valuation systems, according to an embodiment of the invention.
Figure 1B:
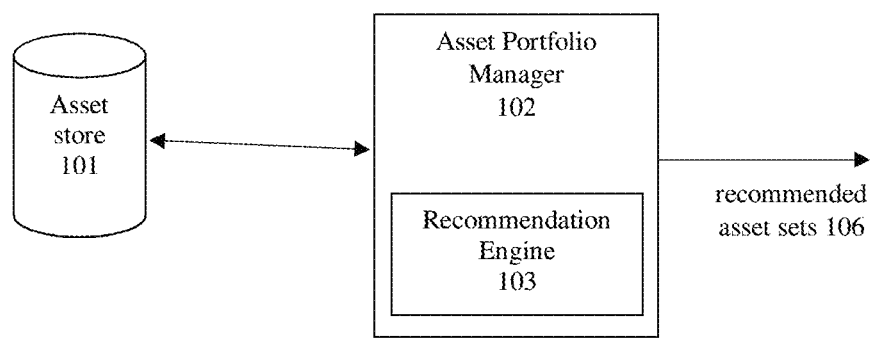

FIGS. 1A and 1B are illustrative views of various aspects of an example system in which the techniques described herein may be practiced, according to an embodiment. The system comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In FIG. 1A, an embodiment is illustrated where an asset portfolio is stored in asset store 101. The assets in the asset portfolio may be any combination of digital content files and/or executables such as: video, audio, music, pictures, articles, books, programs, etc. An asset portfolio manager (APM) 102 assigns a valuation to each asset in the asset portfolio using a recommendation engine 103. The recommendation engine 103 uses the valuations to create one or more recommended asset sets. The one or more sets of recommended assets 105 can be sent to the content provider 104 by the APM 102. The one or more recommended sets may include the actual assets for each set or pointers to the assets stored in the asset store 101. The content provider 104 provides the one or more recommended asset sets 106 to users.

FIG. 1B illustrates an embodiment where the APM 102 is a standalone system or, alternatively, a component of a content provider's server. The APM 102 provides recommended asset sets 106 directly to user devices or to a consumption system.

The embodiments described herein improve the performance of the content servers and content delivery systems by creating asset sets that have a higher probability of being consumed which reduces excess CPU usage and network usage. The efficiency of the content servers and content delivery systems increases because the accuracy of any asset valuation increases as consumption data regarding the asset becomes more detailed for each succeeding time period.

3.0. Functional Overview

Figure 2:
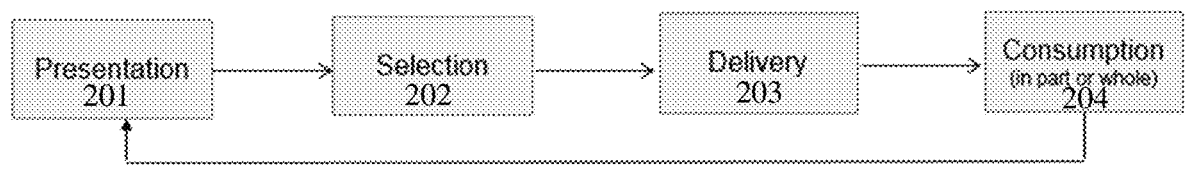
FIG. 2 illustrates an example cycle of asset engagement including presentation, selection, delivery, and consumption according to an embodiment of the invention.

In an embodiment, each of the processes described in this section may be implemented using one or more computer programs, other software elements, and/or digital logic in any combination of general-purpose computing devices or special-purpose computing devices, while performing data retrieval, transformation, and storage operations that involve interacting with and transforming the physical state of memory of the computing devices(s). In an embodiment, a value (e.g., numeric, relational, etc.) is assigned to each member of a set of digital assets that is proportional to the past- and expected-future consumption of each asset in the set. An asset may be any item or product that can be presented or represented (via e.g., an item description, photograph of a physical item, sound file, article, blog post, advertisement, etc.) in an online environment. An engagement may be defined as the temporal window in which the user has focused sensory attention on the set of assets. Referring to FIG. 2, the temporal window may contain four components.

a. Online presentation 201 is the process of physically displaying assets in electronic form using available software and hardware and where the electronic assets displayed may be stored remotely from the display device.

b. Selection 202 is the process associated with a user choosing a specific asset or assets for future consumption.

c. Delivery 203 occurs when the asset is made available for consumption and can include a tangible transfer of the asset to the user device or becomes consumable for online consumption (e.g., a list of selectable assets displayed to a user on the user device, etc.).

d. Consumption 204 of an electronically delivered asset may be immediate and terminates when the end (or a substantial amount) of the electronic file is reached or the user terminates the interaction with an element of the asset set. If a tangible asset(s) needs to be physically delivered to the user device, then consumption may begin upon receipt of the asset(s) by the user device and may terminate when the asset no longer holds any intrinsic value.

During historical online engagements with a specific set of digital assets that occur during time period t, the various actions conducted by an individual user or a plurality of users can be catalogued and leveraged to provide an estimation of the level of engagement for any digital asset, even if it has not been made available for consumption. An embodiment assigns a specific numeric value—proportional to the estimated consumption levels—to a plurality of assets based on an objective of maximizing the value of consumed assets and to aid in the selection of which subset of the available assets will be made available for consumption during time period t. A selection may be the process of determining which subset of assets—selected from a portfolio of available assets—will be made available to user(s) for consumption during time period t. An appropriate selection process is one that results in a presentation of assets that are more likely to be consumed by the user and therefore yields a total value which can be an aggregation of individual values for all assets in the selected set during time period t. The selected set can be referred to as recommended assets. Furthermore, the underlying process for generating recommendations may be referred to as a recommendation system and the computer program that performs a selection of an ordered presentation of assets may be called the recommendation algorithm. The ordered set of recommended assets may be called an ensemble.

Where maximization of realized value for a set of consumable assets is the goal of the optimization, a graph theoretic-based approach may be used to construct a set of recommended assets in the portfolio. In the graph-based framework, the two key components of the graph, $G=\{A,P\}$, are :

A: the n-member set of consumable assets with elements $A=\{\alpha_1, \alpha_2, \ldots, \alpha_n\}$ P: the n×n square matrix of transition probabilities among all possible pairs of asset, $\{\alpha_i,\alpha_j\}$. An individual element of P would be $p_{i,j}$, which would indicate the probability that consumption of asset $\alpha_j$ would commence in an engagement at the end of the consumption of asset $\alpha_i$ during the same engagement.

Figure 3:
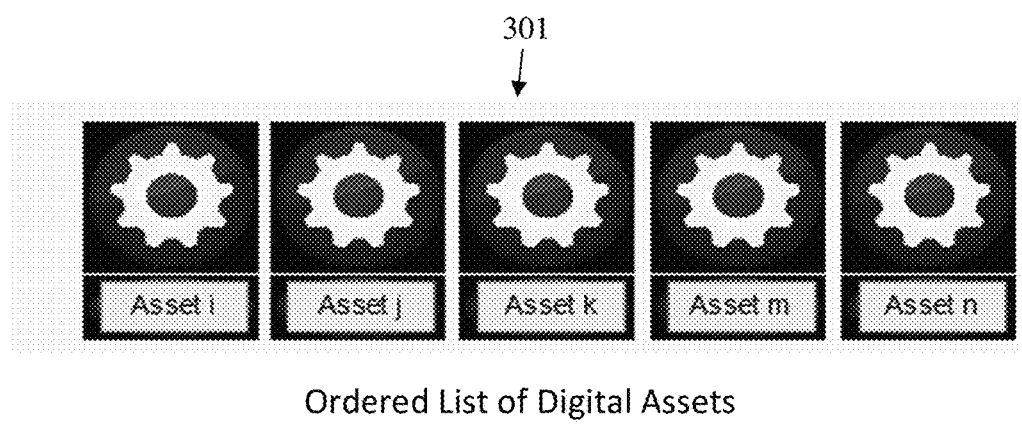
FIG. 3 illustrates an example ordered set of recommended assets, according to an embodiment of the invention.

Referring to FIG. 3, an example of an ordered set/ensemble, A*, of m=5 recommended assets 301 that are selected from the total available portfolio of assets, A (where A*⊆A), for display and consumption by a user during time period t is shown.

4.0 Digital Asset Valuation

In an embodiment, recommendation engine 103 can be used to build sets of assets for presentation that are based on the value expected be derived from the consumption of assets in the ensemble. The recommendation engine 103 may include several components in order to assist the asset portfolio manager (APM) 102 in the construction of recommended assets:

1. A known or estimated amount of supply (the inventory of assets in the portfolio 101, a) and the relationships among them—including a known or estimable probability that any asset in the portfolio will be consumed if presented to a user.

2. An understanding of the algorithm used to select and rank assets for display to a user—the mechanics of the algorithm need not be disclosed as long as there exists an optimization capability that APMs can use to make selections.
3. The unit of measure that allows the rates of consumption for each asset to be proportionally transformed into a value (both direct and indirect) associated with the user's engagement of each asset during the various discrete temporal windows, denoted by t, in which the engagement is active.
4. An ability to assign a numeric value to each asset using the unit of measured based on consumption that reflects:
   a. Marginal value directly realized for an asset if made available for consumption at a single point in time, t.
   b. Value directly realized based on past consumption of an asset (prior to time t).
   c. Value to be directly derived based on future consumption of the asset at other future points in time (t'>t), other than the value derived in a) and b).
5. Rules applied by the APM to account for operational and physical constraints.

The value of asset $\alpha_i$ derived from consumption beginning at time t can be expressed as a simple multiplication of two values:

$$v_t(\alpha_i) = k_{i,t} \times c_{i,t} \quad \text{[Equation 1] where;}$$

$k_{i,t}$: if $w_{i,t}$ is the proportion of asset $\alpha_i$ consumed during an online engagement in time interval t, then a scalar, $k_{i,t}$, can be determined (where $0 \leq k_{i,t} \leq 1$) to reflect the consumption rate for $\alpha_i$. This scalar can be expressed over a continuous range (e.g., $k_{i,t} = w_{i,t}$) or take on discrete values as determined by the APM. For example, one choice of discrete scalar values that may result from the complete set of asset completion proportions, $w_{i,t}$, for asset $\alpha_i$ is:

$$k_{i,t} = \begin{cases} 0 & \text{if } w_{i,t} < 0.50 \\ 0.5 & \text{if } 0.50 \leq w_{i,t} < 0.95 \\ 1.0 & \text{if } 0.95 \leq w_{i,t} \leq 1.00 \end{cases}$$

A similar discrete set of scalars would transform any partial or complete consumption of an asset into its largest possible value and could be interpreted as taking one of two possible binary states ("consumed", "not consumed"):

$$k_{i,t} = \begin{cases} 0 & \text{if } w_{i,t} = 0 \\ 1 & \text{if } w_{i,t} > 0 \end{cases}$$

$c_{i,t}$: a unit of measure that proportionally transforms the consumption of asset $\alpha_i$ at time period t into a value metric reflecting the merits of the benefit of ownership of the asset including the ability to exchange the asset for goods, services, money, goodwill, strategic advantage, economic utility, etc. A non-exhaustive list of example units of measure may include, but is not limited to:
currency (US Dollars ($) or Euros (€)) realized per consumed assets,
number of times the identity of the asset was shared in a social media environment,
change in market share resulting from engagement,
time allocated to engagement,
election votes acquired, and
customer loyalty.

Figure 4:
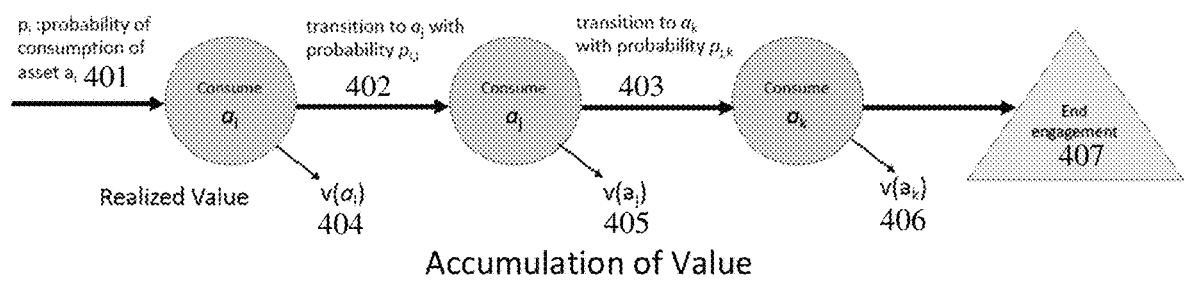
FIG. 4 illustrates an example of value derived from consumption of recommended assets according to an embodiment of the invention.

Referring to FIG. 4, an embodiment illustrating how a set of consumed assets can generate realized value is shown. An example of a small set (m=3) of ordered consumable assets $\{\alpha_i, \alpha_j, \alpha_k\}$ is shown along with the transition probabilities $\{p_{i,j}, p_{j,k}\}$ across the ordered assets. In an ensemble of assets, the probability of consumption for the first asset in an engagement is not based on a transition from a prior asset and is therefore denoted by a single subscript, $p_i$. Sequentially, if a user consumes a proportion, $w_{i,t}$ of asset $\alpha_i$ 401, then the realized value for the consumption of that asset can be derived by first mapping $w_{i,t}$ onto $k_{i,t}$ (the scalar proportional to $w_i$ as described earlier) and then applying the value-based unit of measure—the realized value is then $v_t(\alpha_i)$ 404 based on Equation 1. Should the user then begin consumption of the next asset $\alpha_j$ 402, then value $v_t(\alpha_j)$ 405 is realized after computing $w_{j,t}$, $k_{j,t}$, and applying to Equation 1 (and the cumulative value is $v_t(\alpha_i)+v_t(\alpha_j)$). Should the user then begin consumption of the next asset $\alpha_k$ 403, then value $v_t(\alpha_k)$ 406 is realized after computing $w_{k,t}$, $k_{k,t}$, and applying to Equation 1 (and the cumulative value is $v_t(\alpha_i)+v_t(\alpha_j)+v_t(\alpha_k)$).

In the example, the engagement ends 407 after the consumption of $\alpha_k$, but a more general application would allow a full set of ordered assets (not necessarily using m=3) and where consumption of each asset within an engagement may not necessarily occur.

In general, the total asset value for an ensemble of recommended assets containing m assets, $a = \{\alpha_1, \alpha_2, \ldots \alpha_m\}$ is:

$$v_t(\alpha) = p_1 v_t(\alpha_1) + \Sigma_{j=2}^m p_{j-1,j} v_t(\alpha_j) = p_1 c_{1,t} k_{1,t} + \Sigma_{j=2}^m p_{j-1,j} c_{j,t} k_{j,t} \quad \text{[Equation 2]}.$$

5.0 The Asset Portfolio Manager

Figure 5:
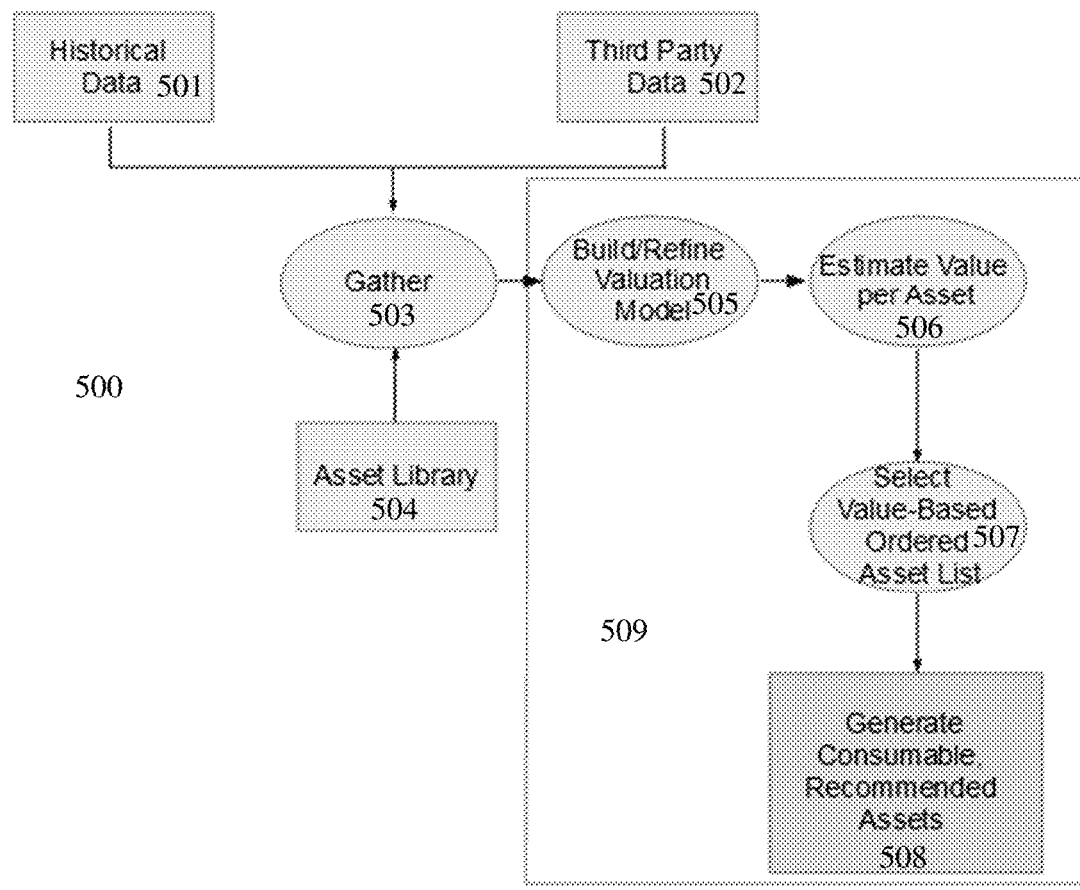
FIG. 5 illustrates how the Asset Portfolio Manager (APM) may collate various forms of information to generate a list of recommended asset according to an embodiment of the invention.

Referring to FIG. 5, in an embodiment, the entire process of generating recommendations may be accomplished by the asset portfolio manager (APM) 500. The APM 500, can access all data, algorithms, can assign asset values as described herein, and then generate the recommendations that are made available to a user engaging the asset(s) selected from the portfolio. The APM's features may be taken advantage by the owner of the collection or another party given authorization to generate recommendations and pursue revenue acquisition on behalf of the owner of the portfolio.

FIG. 5 illustrates an example the flow of information that is managed by the APM 501. The APM can use several usage (e.g., historical data 501, etc.) and/or measurable characteristic (e.g., third party data 502, etc.) sources to provide input into the asset valuation model 505. The asset portfolio is stored in the asset library 504. The system gathers 503 information (e.g., descriptive metadata, identifier, etc.) regarding the portion of the asset portfolio that has been selected as the target asset set (by, e.g., an administrator, customer, customer's agent, revenue assessor, etc.) that is stored in asset library 504, any historical data 501 to be leveraged, and any third party data 502, and passes the gathered information to the recommendation engine 509.

The recommendation engine 509 uses the gathered information to build /refine a valuation model 505 using any historical and third party data. A value is estimated for each asset in the target asset set 506. Based on the estimated values for each of the assets in the target asset set, a list of assets is created that is ordered by value 507. Asset set recommendations are then generated 508 and delivered to the user or content provider for eventual consumption by a user.

6.0 Temporal Decomposition of Asset Value

Asset valuation for any ensemble in a distinct time period can be numerically determined, and the lifetime value of a distinct asset in the set A can also be determined. There are three distinct clusters of time that are relevant to asset valuation and may be decomposed as follows:

Historical value: this is the observed value for an asset $\alpha_i$ based on consumption of the asset by users in prior periods. If t is defined as the next available consumption time window, then historical asset value at any point in time would be:

$$v_\tau(\alpha_i) = k_{i,\tau} c_{i,\tau} \text{ where } \tau < t.$$

Current value: this is the expected asset value if the consumption occurs in time period t the next available consumption time window and was defined earlier as:

$$v_t(\alpha_i) = k_{i,t} c_{i,t}$$

Future value: this is the expected value for an asset $\alpha_i$ based on consumption of the asset in window t, then future asset value at any point in time would be:

$$v_T(\alpha_i) = k_{i,T} c_{i,T} \text{ where } T > t.$$

7.0 Methodology

In an embodiment, an important operation is the computation of the percentage consumed in period t for each member of the asset library, A. Where a digital asset can be partitioned into consumable sub-units, then the percentage consumed for asset $\alpha_i$ in time period t would be:

$$w_{i,t} = \frac{\text{number of sub-units consumed for asset } a_i \text{ in time period } t}{\text{number of sub-units available for consumption for asset } \alpha_i \text{ in time period } t}. \quad \text{[Equation 4]}$$

A non-exhaustive list of examples of sub-units can include:

- For an asset having some duration (consumption of the asset does not occur at a single fixed point, but rather over a time interval): seconds, minutes, or hours are possible sub-units.
- For an asset having distinct sections—such as a news article with several paragraphs or pages—the sub-units would be the smallest piece for which consumption could be measured.
- For an asset having various interactive elements, such as an online survey or interactive map, sub-units would be the components that may be separately engaged via click/hover/manual entry.

7.1 Asset Sub-Unit Consumption

To enable the computation of the percentage of sub-units consumed, the system monitors online engagements and stores historical instances of the sub-unit engagement which are then accessible by the APM. Additionally, the APM has a mechanism that accounts for duplicate consumption of the same sub-unit during the consumption time window. For example, if the asset is a video, the APM decides how to account for the replay of all or certain parts of the video. It is assumed for this discussion that a sub-unit, for which measurable consumption is possible, only be counted once in both the numerator and denominator of Equation 4.

One additional consideration involves the consumable time period t. For this discussion, the consumption window for an asset period, t, begins once the consumption of the first sub-unit is made possible and that consumption of all other possible sub-units for the same asset are assigned to the same time window. For example, if a set of digital assets, $\alpha$, contains m assets, each with s consumable sub-units and the first (or all) of the assets and their sub-units of the asset are made available for consumption at 10:01 PM, then the consumption of any asset's sub-unit within the same engagement for that asset are assigned t=10:01 PM. Finer temporal windows may be used, but the clear definition of t used herein is uniformly applied to all assets and sub-units and reflects the start of the engagement for the presented set of assets, $\alpha$.

7.2 Computing the Percentage Watched Using Historical Data

With the aforementioned collection of asset consumption data prior to time unit t, and an accessible archive of historical data consumption, each indexed by the time window of the consumption ($\tau < t$), then the historical percentage consumed for any assets in the historical data 502, indexed by $\tau$ is computed according to Equation 4. Across all n (n≥1) historical consumption, then the average percentage consumed is:

$$\overline{w}_i = \frac{\sum_{n=1}^{n_i} w_{i,n}}{n_i} \text{ with variance} \quad \text{[Equation 5]}$$

$$\sigma^2(w_i) = \frac{\sum_{n=1}^{n_i}(w_{i,n} - \overline{w}_i)^2}{n_i - 1}$$

Since the percentage consumed for each asset $\alpha_i$ is mapped onto a scalar, $k_{i,t}$, prior to assessment of the asset value, then the more relevant average is:

$$\overline{k}_i = \frac{\sum_{n=1}^{n_i} k_{i,n}}{n_i}. \quad \text{[Equation 6]}$$

Historical Value ($\tau < t$)

Since asset $\alpha_i$ was consumed in the historically observed data, the historical asset value is simply:

$$v_\tau(a_i) = \frac{\sum_{n=1}^{n_i} k_{i,n} c_{i,n}}{n_i} \text{ for any } \tau < t. \quad \text{[Equation 7]}$$

Current Value (t)

This is the expected asset value if the consumption occurs in time period t—the next available consumption time window. There are two data components used in the asset valuation for asset $\alpha_i$ in this scenario: a) historical data on consumption of asset $\alpha_i$—if it exists; and b) historical data on consumption of other assets $A' = A \cap a_i$. To properly leverage data from consumption of other assets, several steps may be conducted:

1. A subset, $A_j \subseteq A'$ must first be selected based on shared structural characteristics with $\alpha_i$. For example, the elements of $A_j$ may be a similar file type (*.mpg, *.gif, etc.) and share to be grouped into a similar categorical theme (e.g., sports, news, entertainment, lifestyle, etc.). As the purpose of using historical data from other assets is to be used as an input to the estimated asset valuation for asset $\alpha_i$, this sub-setting process (also known as stratification or partitioning) can remove the effects of historical consumption data for assets that perhaps have an underlying asset valuation that would be inappropriate and perhaps misleading.

2. For each element of $A_j$ and each historical observation associated with its consumption, compute the percentage consumed $$w_{j,\tau} = \frac{\text{number of sub-units consumed for asset } a_j \text{ in time period } \tau}{\text{number of sub-units available for consumption for asset } a_{ij} \text{ in time period } t\tau} \quad a_j \in A_j$$

and store three columns of data $x_{j,\tau} = \{w_{j,\tau}, g_{j,\tau}, s_{j,\tau}, r_{i,\tau}\}$ where:

$w_{j,\tau}$ is defined above, $g_{j,t}$ is the age of the asset relative to its consumption (if the digital asset $\alpha_j$ was created at time $\gamma$, then $g_{j,\tau} = \gamma - \tau$), $s_{j,\tau}$ is the number of consumable sub-units of $\alpha_j$, $r_{j,\tau}$ is any other measurable characteristic of $\alpha_j$ that can be included in the analysis that is not part of the historical data, but may be available through a third party (for example, a measure of asset popularity or knowledge that the consumption was related to an unusual event, etc.).

3. Compute the variance of the percentage consumption rates over all element in $A_j$ ($j = \ldots J$) and all observed time periods:

$$\sigma^2(w_j) = \frac{\sum_{j=1}^{J}\sum_{n=1}^{n_j}(w_{j,n} - \overline{w}_j)^2}{\left(\sum_{j=1}^{J} n_j\right) - 1} \quad \text{where } \overline{w}_j = \frac{\sum_{j=1}^{J}\sum_{n=1}^{n_j} w_{j,n}}{\sum_{j=}^{J} n_j}$$

4. Using a logistic regression equation using all combined observations associated with historical consumption of assets in $A_j$, determine the relationship between the dependent variable $w_{j,\tau}$ and the two independent variables $g_{j,\tau}, s_{j,\tau}$. Expressed as a linear equation, this relationship would be described as:

$$\log\left(\frac{w_{j,\tau}}{1 - w_{j,\tau}}\right) = \alpha + \beta_1 g_{j,\tau} + \beta_2 s_{j,\tau} + \beta_3 r_{j,\tau} + \varepsilon \quad \text{[Equation 8]}$$

And the estimated values would be:

$$\log(\tfrac{w_{j,\tau}}{1-w_{j,\tau}}) = \hat{\alpha} + \widehat{\beta_1}g_{j,\tau} + +\widehat{\beta_2}s_{j,\tau} + +\widehat{\beta_3}r \quad \text{[Equation 9]}$$

5. Estimate the percentage watched for $\alpha_i$ in period t by setting $\tau = t$:

$$\hat{w}_{i,t} = \frac{\exp(\hat{\alpha} + \widehat{\beta_1}g_{i,t} + \widehat{\beta_2}s_{i,t} + +\widehat{\beta_3}r_{i,t})}{(1 + \exp(\hat{\alpha} + \widehat{\beta_1}g_{i,t} + \widehat{\beta_2}s_{i,t} + \widehat{\beta_3}r_{i,t}))} \quad \text{[Equation 10]}$$

6. Combine the estimated percentage consumed from Equation 10 with the historical percentage watched from Equation 5 (if it exists) according to the following:

$$\overline{w}_{i,t} = \begin{cases} \theta \overline{w}_{i,t} + (1-\theta)\hat{w}_{i,t} & \text{if } \overline{w}_{i,t} \text{ exists} \\ \hat{w}_{i,t} & \text{otherwise} \end{cases}$$

where $\theta = \dfrac{\sigma^2(w_j) / \left(\sum_{j=}^{J} n_j\right)}{\sigma^2(w_j) / \left(\sum_{j=}^{J} n_j\right) + \sigma^2(w_i)/n_i}$ is the relative percentage of variance in the two components used in the linear estimators?

7. Map the estimated percentage consumed onto its appropriate scalar value $\overline{w}_{i,t} \to k_{i,t}$.

8. Compute the estimated value for $\alpha_i$ at time period t:

$$v_t(\alpha_i) = k_{i,t} c_{i,t}.$$

Future Value (T>t)

The operations associated with assigning a numeric value for asset $a_i$ in any future period (T>t) follows the same 8 step procedure as defined for present value with slight modification; at step 4, the time value is used to estimate the percentage consumed at time T:

$$\hat{w}_{i,t} = \frac{\exp(\hat{\alpha} + \widehat{\beta_1}g_{i,T} + \widehat{\beta_2}s_{i,T} + \widehat{\beta_3}r_{i,T})}{(1 + \exp(\hat{\alpha} + \widehat{\beta_1}g_{i,T} + \widehat{\beta_2}s_{i,T} + \widehat{\beta_3}r))}$$

and steps 5, 6, 7, and 8 then reflect the resulting estimated percentage consumed and the resulting value $v_T(\alpha_i) = k_{i,T} c_{i,T}$.

Lifetime Value of Distinct Asset, $\alpha_i$

In an embodiment, the Lifetime Value, $V(\alpha_i)$, can be determined for any consumable asset $\alpha_i$ and can be computed by aggregating consumption by each user $u = 1 \ldots, U$ during the time period in which consumption is possible and occurred, $\tau = 0, 1, \ldots, t-1, t, t+1, \ldots T$:

$$V(a_i) = \sum_{u=1}^{U} \sum_{\tau=0}^{T} I_{u,\tau}(a_i) \times v_\tau(a_i) \quad \text{[Equation 3]}$$

where $$I_{u,\tau}(a_i) = \begin{cases} 1 & \text{user } u \text{ consumes asset } a_i \text{ in the period } t \\ 0 & \text{otherwise} \end{cases}$$

The use of individual value computations described herein may be used directly in the lifetime asset value computation without modification as an embodiment of the invention.

7.3 Value-Based Digital Assets Selection

In an embodiment, to enable selection of the ensemble of assets to make available for consumption in time period t for a known library of consumable assets, A and a predefined number of assets, m, to display, the choice of the selected ensemble $\alpha_m = \{\alpha_1, \alpha_2, \ldots, \alpha_m\}$ would be the one for which the ordered set maximizes value vt(am) as expressed in Equation 11. The set of ensembles can be determined using a brute force method, looking at all possible combinations and orderings of available asset ensembles having size m.

$$v_t(\alpha)=p_1v_t(\alpha_1)+\Sigma_{j=2}{}^m p_{j-1,j}v_t(\alpha_j)=p_1c_{1,t}k_{1,t}+ \Sigma_{j=2}{}^m p_{j-1,j}c_{j,t}k_{j,t}$$ [Equation 11]

A more simplified search could be conducted, however, if the APM defined operational constraints and rules. For example, the APM may require that certain assets appear in the ensemble, that certain assets not appear in the ensemble (for example, if the user has—or is expected to—consume a particular asset in a different time period other than t), that duplication of assets in the ensemble is (dis)allowed, or that certain ordering of assets is preferred (for example, that asset $a_i$ must be promoted so that it appears as the first asset in the ensemble for consumption in time period t). The probabilities of transition can be determined using a graph-theoretic similarity-based mechanism as described in U.S. patent application Ser. No. 14/811,824, entitled "Online Asset Recommendation System" filed on Jul. 28, 2015, owned by the Applicant and incorporated by reference in its entirety herein. Application of APM rules that limit the contents of any ensemble of assets can use the approaches described in U.S. patent application Ser. No. 14/811,803, entitled "Ensemble-Based Multimedia. Asset Recommendation System" filed on Jul. 28, 2015, owned by the Applicant and incorporated by reference in its entirety herein.

8.0 Continuous Play Video Recommendations

In an embodiment, the system can use a version of any of the embodiments to maximize the expected value associated with a set of video (a type of electronic asset) recommendations for consumption. The system has a continuous-play feature that seamlessly builds a sequential set of videos that may be consumed without interruption. The feature allows an entire video playlist to be constructed and consumed and, should user interaction suggest that a particular video asset consumption has terminated, present a revised list of recommendations.

An embodiment allows clients (e.g., content providers, website providers, etc.) to modify the set of videos with their video recommendations.

The asset valuation may be conducted by a single APM located as a distinct geographic location. The recommendation engine is a sophisticated set of algorithms that employ any combination of: demographic, geospatial, historical engagement data, including user-level features, asset valuation, video keywords that are used to partition the data into groups and provide group-level recommendations, etc. In many cases, where sufficient information on users exist, groups can represent single users. Additionally, a user may sometimes engage the recommendation engine in one of the following modes:

a) as a single user seeking recommended videos that appeal to his/her interest, or b) as a representative of a household seeking recommendations for multiple users sharing a video engagement.

8.1 Varying an Online Video's Asset Value Based on the Position of the Asset in the Playlist In another embodiment, separate values $v_t$ (ai) can be estimated based on the position in which the asset appears in the ensemble. An ordered video playlist is an ensemble of video assets that is presented to a user based upon some action to initiate the consumption. Therefore, in a continuous play environment, the first asset in the ensemble is displayed based on a user action such as visiting a website with an embedded video, clicking on video embedded in document, email, or social media site. Beyond the consumption of the initial asset in a playlist, assets in later ordered positions become automatically consumable based on the completion of the previous asset. Since consumption of the initial and subsequent assets begins based on different events (the continuous play feature means that videos after the initial asset begin playing automatically), it is possible that the asset's value is therefore dependent upon the position in which it is being evaluated (e.g., the asset is consumed more often when presented in an earlier position rather than a later position, the asset is consumed more often when presented in a later position rather than an earlier position, the asset is consumed more often when in a set position (e.g., second, third, fourth, etc.), etc.). This would then mean that the individual asset value be computed for each consumption position j where—in an asset ensemble of size m, then j=1, . . . , m−1, m.

$$v_\tau^{(j)}(\alpha_i)=k^{(j)}_{i,\tau}c^{(j)}_{i,\tau}$$

$k^{(j)}_{i,t}$: if $w^{(j)}_{i,t}$ is the proportion of asset $\alpha_i$ consumed during an online engagement in the $j^{th}$ position in time interval t, then a scalar, $k^{(j)}_{i,t}$, can be determined (where $0 \leq k^{(j)}_{i,t} \leq 1$) to reflect the consumption rate for $\alpha_i$ in the $j^{th}$ position. Where historical or predicted data is being used to generate the $k^{(j)}_{i,t}$, naturally this would restrict the input data to contain only those historical observations that were observed while the asset was consumed in the in the $j^{th}$ position.

$c^{(j)}_{i,t}$: a unit of measure that proportionally transforms the consumption of asset $\alpha_i$ in the $j^{th}$ position at time period t into a value metric reflecting the merits of the benefit of ownership of the asset including the ability to exchange the asset for goods, services, money, goodwill, strategic advantage, economic utility, etc.

8.2 Reduced Asset Value Calculations

Though consumption of the initial and subsequent assets begins based on different actions, it is possible that the asset's value may not differ much when consumed during the continuous play period (after the end of consumption of the initial asset in the j=1 position). Additionally, there may be cases where there is too little historical information to produce reliable asset value estimates in later positions due to the finite temporal window in which a user will remain engaged. In either case, one embodiment can—rather than break out asset value computations for each j=1, . . . , m−1, m, positions in the ensemble—simply generate two separate asset values:

$$v_\tau^{(I)}(\alpha_i)=k^{(I)}_{i,\tau}c^{(I)}_{i,\tau}$$

$$v_\tau^{(R)}(\alpha_i)=k^{(R)}_{i,\tau}c^{(R)}_{i,\tau}$$

where the value of the position of the asset under evaluation, j, can take on one of two discrete states:

$$j = \begin{cases} I & \text{if } j = 1 \text{(the asset is being evaluated in the first position)} \\ R & \text{if } j > 1 \text{(the assets is being evaluated as a recommendation)} \end{cases}$$

The historical data used to produce estimates of asset value to be consumed in the later cases (recommendations for which j>1) would be pooled together for the asset in all positions other than j=1 without further consideration of the order in which that asset historically appeared as a recommendation.

8.3 An Example of Transforming Consumption of an Asset Into a Tangible Value

In the continuous play video environment, the consumption of assets is tangible, measurable and asset value can be explicitly defined as the total expected number of videos to be consumed during a user engagement once the consumption of the asset under valuation commences. With reference back to Equation 11, a simplification would be to anticipate the number of total views expected to follow the presentation of an asset as the sum of a) the expected consumption of the selected video itself and b) the expected number of views that will follow due to consumption of additional video assets that appear in as a result of continuous play. For example, assume that the value of asset $a_i$ is being conducted in the initial position (j=1) at time $\tau$. Then, the asset value could simply be $v_\tau^{(I)}(\alpha_i)$=expected percentage watched for $\alpha_i$+expected number of recommended views expected to occur in the same time window after $\alpha_i$ is consumed. The data used to make the computation would simply look at historical average values for percentage watched and average follow-on views when $\alpha_i$ has historically been shown in the j=1 position.

8.4 An Example of Speeding Up the Computing Device

In an embodiment, a very simplified version of asset value computations can be implemented with little computational overhead, thus speeding up the performance of the overall system by reducing the need for extensive data modeling and optimization, particularly when the ensemble is created using collections of the assets independently (not considered as a set) determined to have the highest individual values. In effect, rather than trying to run an optimization across all permutations of assets to determine the ensemble of size m with the highest expected value, one can just build a collection of m assets with the highest individual values ignoring the order in which they are presented for consumption. If the first asset (the initial asset) is known for an ensemble of size m, then the remaining m−1 assets will be the ones with the highest values in their respective positions (or just among all assets to be shown in the recommended positions without regard to specific position number). Should this approach result in an asset being duplicated in an ensemble (so that it would appear more than once) and where such an outcome is not desired, the selection of assets for the ensemble in the recommended position could be restricted to include the distinct assets (no duplicates allowed) with the highest asset values in their specified position. That is, if an asset has already been selected to fill another position, it becomes ineligible to be selected for another position in the same ensemble.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

9.0 Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 6:
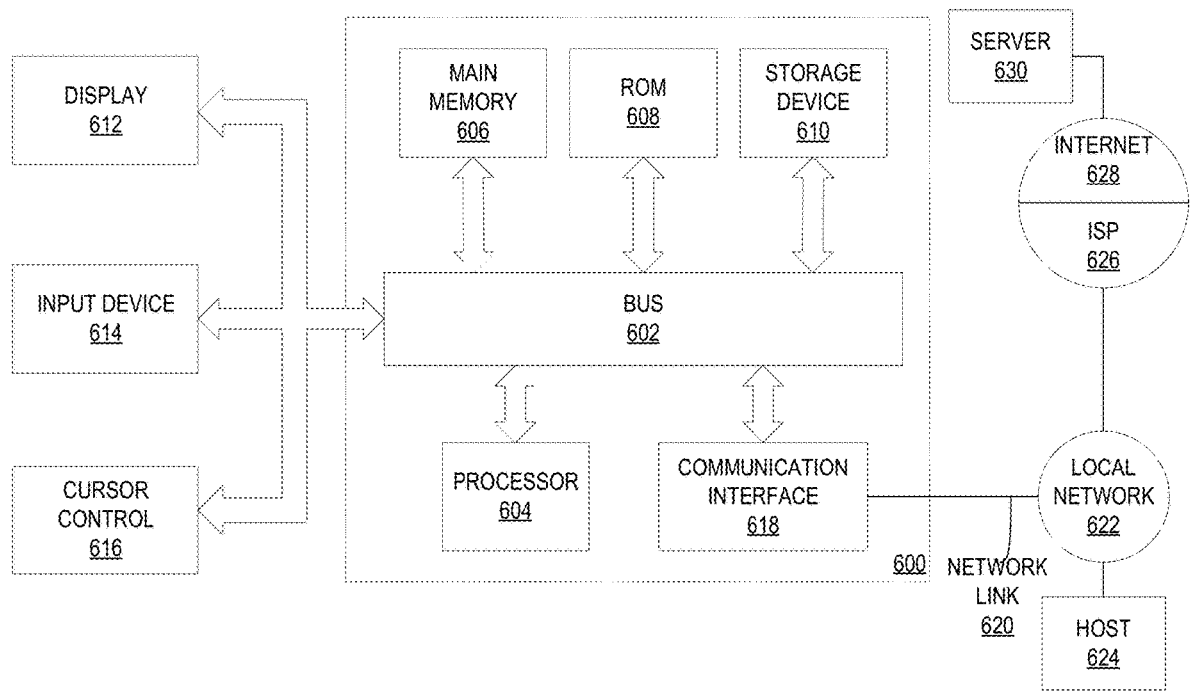
FIG. 6 is block diagram of a computer system upon which embodiments of the invention may be implemented.

FIG. 6 is a block diagram that illustrates a computer system 600 utilized in implementing the above-described techniques, according to an embodiment. Computer system 600 may be, for example, a desktop computing device, laptop computing device, tablet, smartphone, server appliance, computing mainframe, multimedia device, handheld device, networking apparatus, or any other suitable device.

Computer system 600 includes one or more busses 602 or other communication mechanism for communicating information, and one or more hardware processors 604 coupled with busses 602 for processing information. Hardware processors 604 may be, for example, a general purpose microprocessor. Busses 602 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 600 also includes a main memory 606, such as a random access memory (RAM) or other dynamic or volatile storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes one or more read only memories (ROM) 608 or other static storage devices coupled to bus 602 for storing static information and instructions for processor 604. One or more storage devices 610, such as a solid-state drive (SSD), magnetic disk, optical disk, or other suitable non-volatile storage device, is provided and coupled to bus 602 for storing information and instructions.

Computer system 600 may be coupled via bus 602 to one or more displays 612 for presenting information to a computer user. For instance, computer system 600 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 612 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 612.

In an embodiment, output to display 612 may be accelerated by one or more graphics processing unit (GPUs) in computer system 600. A GPU may be, for example, a highly parallelized, multi-core floating point processing unit highly optimized to perform computing operations related to the display of graphics data, 3D data, and/or multimedia. In addition to computing image and/or video data directly for output to display 612, a GPU may also be used to render imagery or other video data off-screen, and read that data back into a program for off-screen image processing with very high performance. Various other computing tasks may be off-loaded from the processor 604 to the GPU.

One or more input devices 614 are coupled to bus 602 for communicating information and command selections to processor 604. One example of an input device 614 is a keyboard, including alphanumeric and other keys. Another type of user input device 614 is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Yet other examples of suitable input devices 614 include a touch-screen panel affixed to a display 612, cameras, microphones, accelerometers, motion detectors, and/or other sensors. In an embodiment, a network-based input device 614 may be utilized. In such an embodiment, user input and/or other information or commands may be relayed via routers and/or switches on a Local Area Network (LAN) or other suitable shared network, or via a peer-to-peer network, from the input device 614 to a network link 620 on the computer system 600.

A computer system 600 may implement techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 600 can receive the data on the network and demodulate the signal to decode the transmitted instructions. Appropriate circuitry can then place the data on bus 602. Bus 602 carries the data to main memory 606, from which processor 604 retrieves and executes the instructions. The instructions received by main memory 606 may optionally be stored on storage device 610 either before or after execution by processor 604.

A computer system 600 may also include, in an embodiment, one or more communication interfaces 618 coupled to bus 602. A communication interface 618 provides a data communication coupling, typically two-way, to a network link 620 that is connected to a local network 622. For example, a communication interface 618 may be an integrated services digital network (ISDN) card, cable modem, satellite modem, or a modem to provide a data communication connection to a corresponding type of telephone line. As another example, the one or more communication interfaces 618 may include a local area network (LAN) card to provide a data communication connection to a compatible LAN. As yet another example, the one or more communication interfaces 618 may include a wireless network interface controller, such as a 802.11-based controller, Bluetooth controller, Long Term Evolution (LTE) modem, and/or other types of wireless interfaces. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by a Service Provider 626. Service Provider 626, which may for example be an Internet Service Provider (ISP), in turn provides data communication services through a wide area network, such as the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

In an embodiment, computer system 600 can send messages and receive data, including program code and/or other types of instructions, through the network(s), network link 620, and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. As another example, information received via a network link 620 may be interpreted and/or processed by a software component of the computer system 600, such as a web browser, application, or server, which in turn issues instructions based thereon to a processor 604, possibly via an operating system and/or other intermediate layers of software components.

In an embodiment, some or all of the systems described herein may be or comprise server computer systems, including one or more computer systems 600 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

10.0 Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
performing by one or more computing devices:
generating transition probabilities from historical online engagement data collected with a plurality of user devices;
accessing the transition probabilities in a subset of electronic assets, in a plurality of electronic assets stored in an asset store;
setting up a transition probability matrix for the accessed transitioning probabilities;
constructing a graph using the transition probability matrix to be applied in a graph-theoretic optimization algorithm to maximize values of recommended assets;
calculating a future consumption value for each electronic asset, in at least a portion of a plurality of electronic assets stored in an asset store, by calculating an estimated percentage of the electronic asset to be consumed at a future time, the calculating the estimated percentage using information retrieved from a third party source;
calculating a valuation for each electronic asset in the at least a portion of the plurality of electronic assets using historical consumption data retrieved from the asset store associated with the electronic asset and the future consumption value of the electronic asset, the historical consumption data includes actions taken by users while viewing the electronic asset;
performing in an online environment by one or more server computing devices that implement the graph-theoretic optimization algorithm:
applying the graph-theoretic optimization algorithm to select a set of electronic assets from the plurality of electronic assets using the calculated valuation for electronic assets in the set of electronic assets;
creating an ordered list of the set of electronic assets based on the calculated valuations, the calculated valuation of a particular electronic asset is varied based on a position in the ordered list of the particular electronic asset;
creating a playlist comprised of an asset store storage location pointer for each electronic asset in the ordered list, the playlist being created to enable a user device to continuously play the set of electronic assets;
sending, via a network, the playlist to a user device; wherein information from at least a portion of the playlist is displayed by the user device;
monitoring user interaction with the user device to determine whether a consumption of a particular electronic asset in the set of electronic assets is terminated,
sending a revised playlist including a revised list of electronic assets to the user device in response to determining, based on the user interaction, that the consumption of the particular electronic asset is terminated.

2. The method as recited in claim 1, wherein an electronic asset is partitioned into sub-units, each sub-unit having a consumption value.

3. The method as recited in claim 1, wherein an electronic asset includes any combination of digital: video, audio, music, pictures, articles, books, or executable programs.

4. The method as recited in claim 1, wherein the calculating a valuation includes using an expected asset value if consumption of the electronic asset occurs within a certain time period.

5. The method as recited in claim 1, wherein the calculating a valuation includes calculating a valuation for a plurality of positions within previous lists where the electronic asset was been consumed.

6. The method as recited in claim 1, wherein the calculating a valuation includes calculating a valuation for a plurality of positions within previous lists where the electronic asset was been consumed, and wherein the creating an ordered list of the set of electronic assets includes evaluating a particular electronic asset based on a presentation position in one or more previous lists.

7. The method as recited in claim 1, wherein each electronic asset in the ordered list is automatically played in sequential order by the user device.

8. One or more non-transitory computer-readable storage media, storing one or more sequences of instructions, which when executed by one or more processors cause performance of:
performing by one or more computing devices:
generating transition probabilities from historical online engagement data collected with a plurality of user devices;
accessing the transition probabilities in a subset of electronic assets, in a plurality of electronic assets stored in an asset store;
setting up a transition probability matrix for the accessed transitioning probabilities;
constructing a graph using the transition probability matrix to be applied in a graph-theoretic optimization algorithm to maximize values of recommended assets;
calculating a future consumption value for each electronic asset, in at least a portion of a plurality of electronic assets stored in an asset store, by calculating an estimated percentage of the electronic asset to be consumed at a future time, the calculating the estimated percentage using information retrieved from a third party source;
calculating a valuation for each electronic asset in the at least a portion of the plurality of electronic assets using historical consumption data retrieved from the asset store associated with the electronic asset and the future consumption value of the electronic asset, the historical consumption data includes actions taken by users while viewing the electronic asset;
performing in an online environment by one or more server computing devices that implement the graph-theoretic optimization algorithm:
applying the graph-theoretic optimization algorithm to a set of electronic assets from the plurality of electronic assets using the calculated valuation for electronic assets in the set of electronic assets;
creating an ordered list of the set of electronic assets based on the calculated valuations, the calculated valuation of a particular electronic asset is varied based on a position in the ordered list of the particular electronic asset;
creating a playlist comprised of an asset store storage location pointer for each electronic asset in the ordered list, the playlist being created to enable a user device to continuously play the set of electronic assets;
sending, via a network, the playlist to a user device;
wherein information from at least a portion of the playlist is displayed by the user device; monitoring user interaction with the user device to determine whether a consumption of a particular electronic asset in the set of electronic assets is terminated;
sending a revised playlist including a revised list of electronic assets to the user device in response to determining, based on the user interaction, that the consumption of the particular electronic asset is terminated.

9. The one or more non-transitory computer-readable storage media as recited in claim 8, wherein an electronic asset is partitioned into sub-units, each sub-unit having a consumption value.

10. The one or more non-transitory computer-readable storage media as recited in claim 8, wherein an electronic asset includes any combination of digital: video, audio, music, pictures, articles, books, or executable programs.

11. The one or more non-transitory computer-readable storage media as recited in claim 8 , wherein the calculating a valuation includes using an expected asset value if consumption of the electronic asset occurs within a certain time period.

12. The one or more non-transitory computer-readable storage media as recited in claim 8, wherein the calculating a valuation includes calculating a valuation for a plurality of positions within previous lists where the electronic asset was been consumed.

13. The one or more non-transitory computer-readable storage media as recited in claim 8, wherein the calculating a valuation includes calculating a valuation for a plurality of positions within previous lists where the electronic asset was been consumed, and wherein the creating an ordered list of the set of electronic assets includes evaluating a particular electronic asset based on a presentation position in one or more previous lists.

14. The one or more non-transitory computer-readable storage media as recited claim 8, wherein each electronic asset in the ordered list is automatically played in sequential order by the user device.

15. A system, comprising:
one or more processors;
one or more non-transitory computer-readable storage media, storing one or more sequences of instructions, which when executed by the one or more processors cause performance of:
performing by one or more computing devices:
generating transition probabilities from historical online engagement data collected with a plurality of user devices;
accessing the transition probabilities in a subset of electronic assets, in a plurality of electronic assets stored in an asset store;
setting up a transition probability matrix for the accessed transitioning probabilities;
constructing a graph using the transition probability matrix to be applied in a graph-theoretic optimization algorithm to maximize values of recommended assets;
calculating a future consumption value for each electronic asset, in at least a portion of a plurality of electronic assets stored in an asset store, by calculating an estimated percentage of the electronic asset to be consumed at a future time, the calculating the estimated percentage using information retrieved from a third party source;

calculating a valuation for each electronic asset in the at least a portion of the plurality of electronic assets using historical consumption data retrieved from the asset store associated with the electronic asset and the future consumption value of the electronic asset, the historical consumption data includes actions taken by users while viewing the electronic asset;

performing in an online environment by one or more server computing devices that implement the graph-theoretic optimization algorithm:

applying the graph-theoretic optimization algorithm to select a set of electronic assets from the plurality of electronic assets using the calculated valuation for electronic assets in the set of electronic assets;

creating an ordered list of the set of electronic assets based on the calculated valuations, the calculated valuation of a particular electronic asset is varied based on a position in the ordered list of the particular electronic asset;

creating a playlist comprised of an asset store storage location pointer for each electronic asset in the ordered list, the playlist being created to enable a user device to continuously play the set of electronic assets;

sending, via a network, the playlist to a user device;

wherein information from at least a portion of the playlist is displayed by the user device;

monitoring user interaction with the user device to determine whether a consumption of a particular electronic asset in the set of electronic assets is terminated;

sending a revised playlist including a revised list of electronic assets to the user device in response to determining, based on the user interaction, that the consumption of the particular electronic asset is terminated.

16. The system as recited in claim 15, wherein an electronic asset is partitioned into sub-units, each sub-unit having a consumption value.

17. The system as recited in claim 15, wherein an electronic asset includes any combination of digital: video, audio, music, pictures, articles, books, or executable programs.

18. The system as recited in claim 15, wherein the calculating a valuation includes using an expected asset value if consumption of the electronic asset occurs within a certain time period.

* * * * *